United States Patent [19]

Buerkle

[11] Patent Number: 5,388,503

[45] Date of Patent: Feb. 14, 1995

[54] HIGH SPEED FOOD PROCESSING DEVICE

[76] Inventor: Alfred Buerkle, 4380 Brentwood, Wheat Ridge, Colo. 80033

[21] Appl. No.: 900,798

[22] Filed: Jun. 22, 1992

Related U.S. Application Data

[63] Continuation of Ser. No. 739,813, Aug. 2, 1991, abandoned, which is a continuation-in-part of Ser. No. 459,150, Dec. 29, 1989, abandoned.

[51] Int. Cl.⁶ .............................................. A47J 37/00
[52] U.S. Cl. ........................................ 99/349; 99/353; 99/443 C; 100/151; 100/178
[58] Field of Search ............... 99/349, 339, 443 C, 99/352; 100/177, 178, 222, 151

[56] References Cited

U.S. PATENT DOCUMENTS

| | | | |
|---|---|---|---|
| 3,379,141 | 4/1968 | Groth | 99/349 |
| 3,397,655 | 8/1968 | Valadez | 107/15 |
| 3,565,015 | 2/1971 | Jorgensen | |
| 4,197,792 | 4/1980 | Mendoza | 99/349 |
| 4,711,164 | 12/1987 | Mendoza | 99/339 |
| 4,715,272 | 12/1987 | Mendoza | 99/339 |
| 4,905,581 | 3/1990 | Kirkpatrick | 99/349 |
| 4,938,126 | 7/1990 | Rubio et al. | 99/349 |

Primary Examiner—David A. Scherbel
Assistant Examiner—Patrick Brinson
Attorney, Agent, or Firm—Aquilino & Welsh

[57] ABSTRACT

A high speed food processing device wherein the device has a continuous moving belt of non-stick material for carrying the food product, and an upper and lower heat platens capable of moving with the food product so that there is no interruption of the forward movement of the continuously moving belt whereby the platens start in a rear-most position, clamp the moldable dough on the non-stick belt and move forward with the continuously moving belt cooking the food product at the same time, then releasing and returning to the rearmost position starting the cycle over again. A single drive mechanism simultaneously drives the continuous forward movement of the non-stick belt and the back and forth movement of the upper and lower platens.

6 Claims, 4 Drawing Sheets

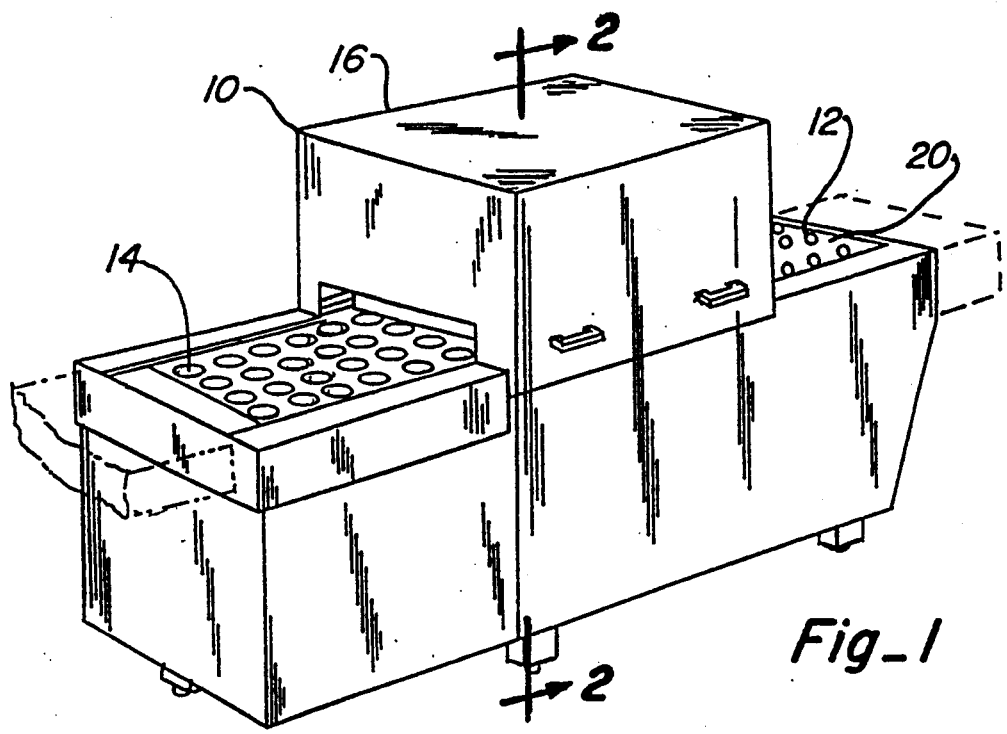
Fig_1
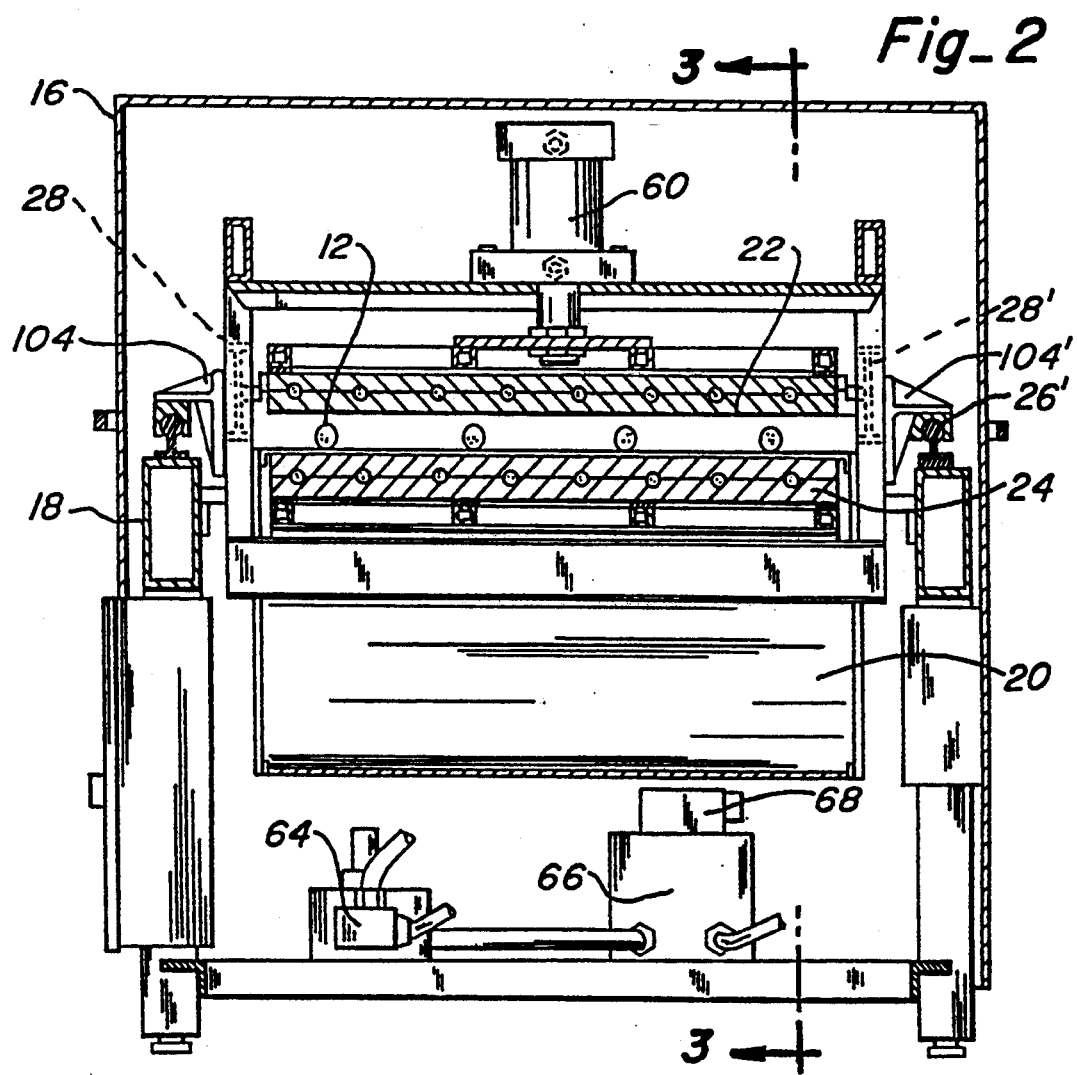
Fig_2

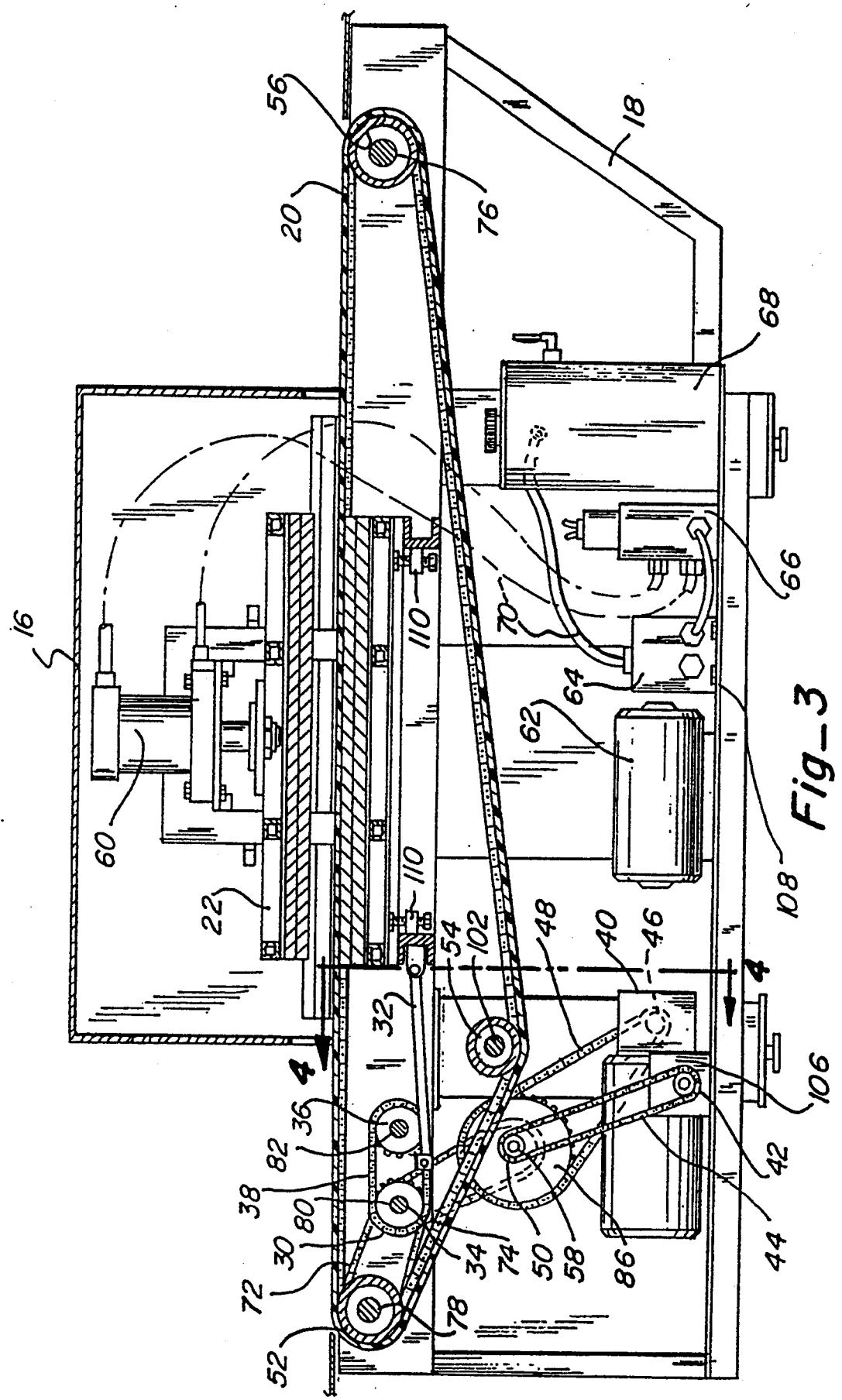
Fig_3

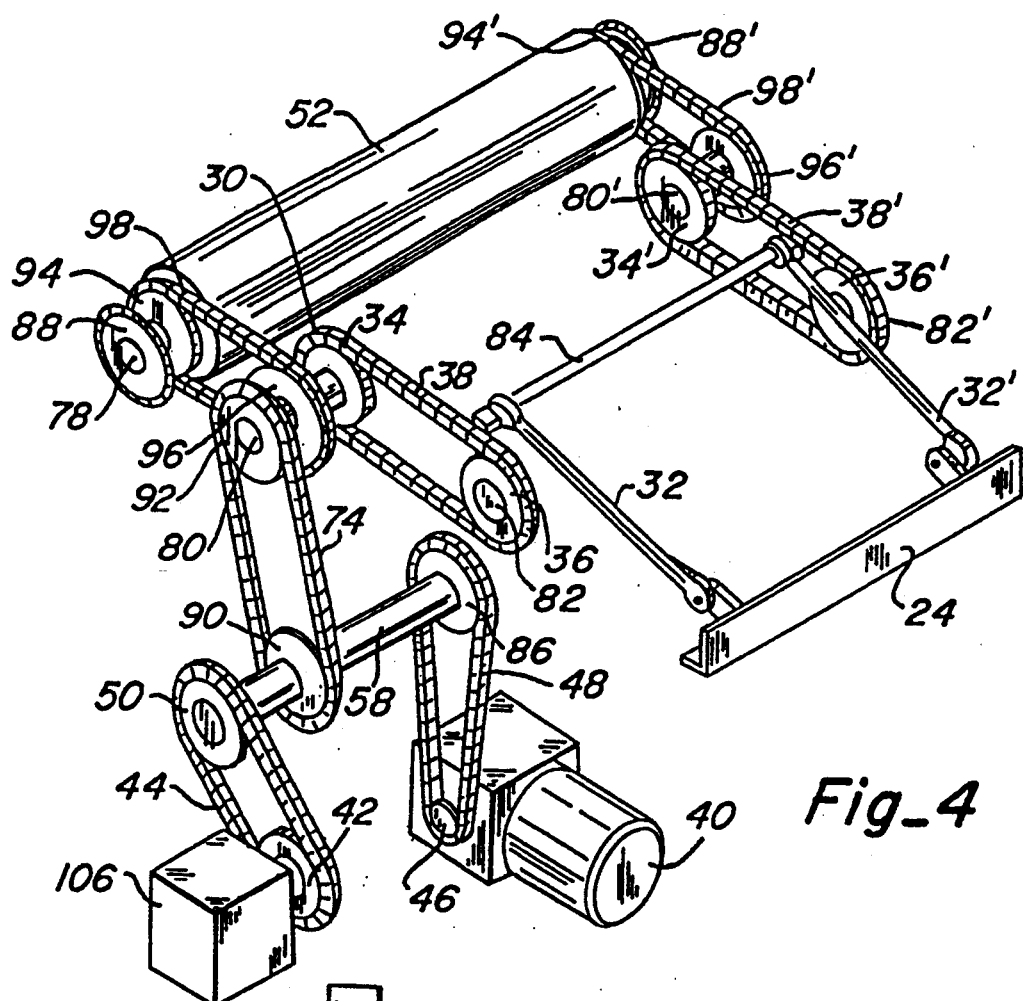
Fig_4
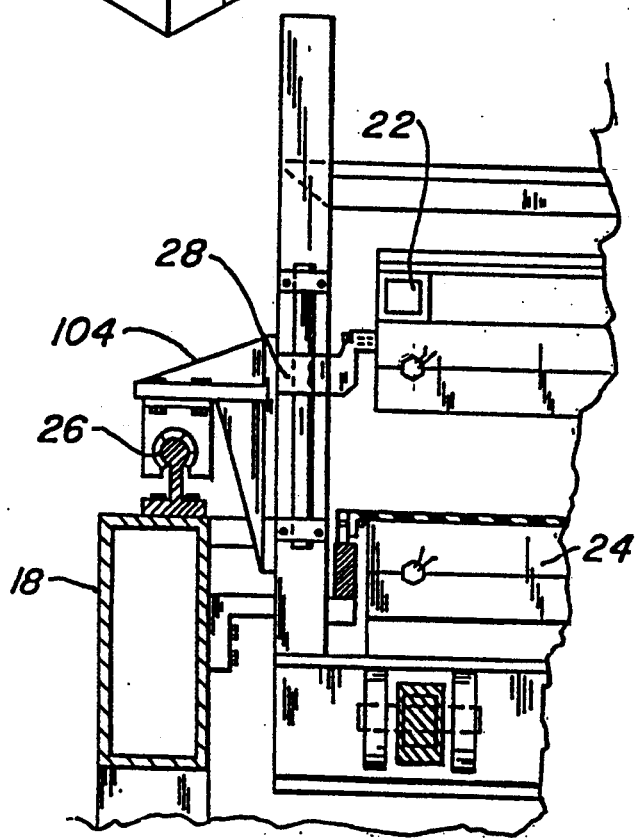
Fig_5

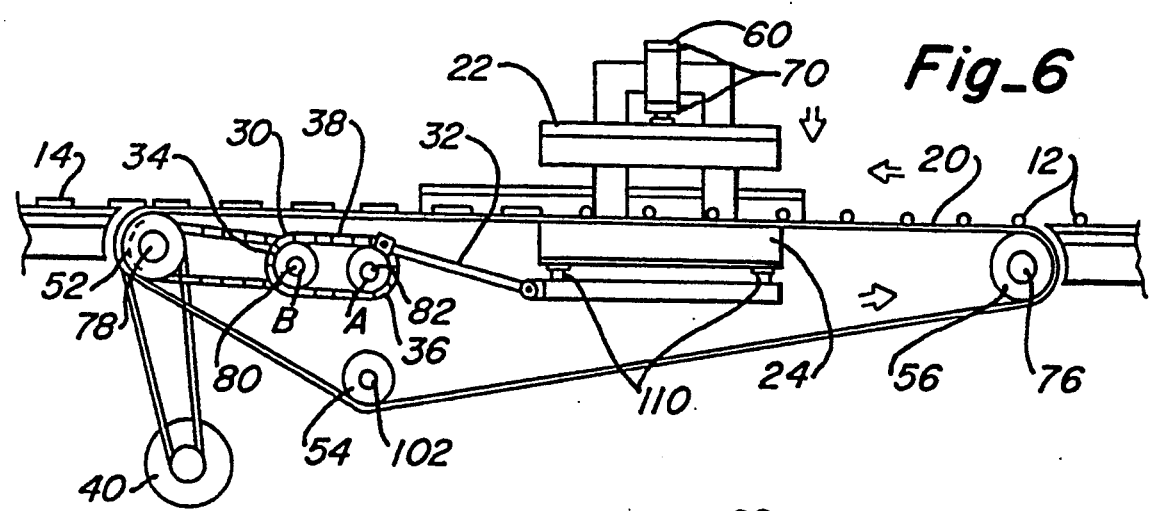
Fig_6
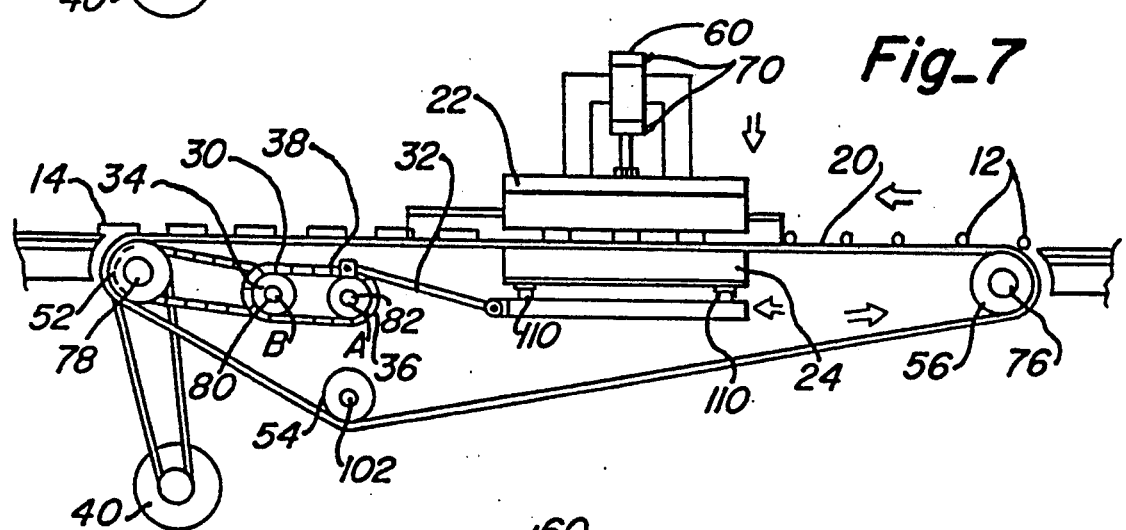
Fig_7
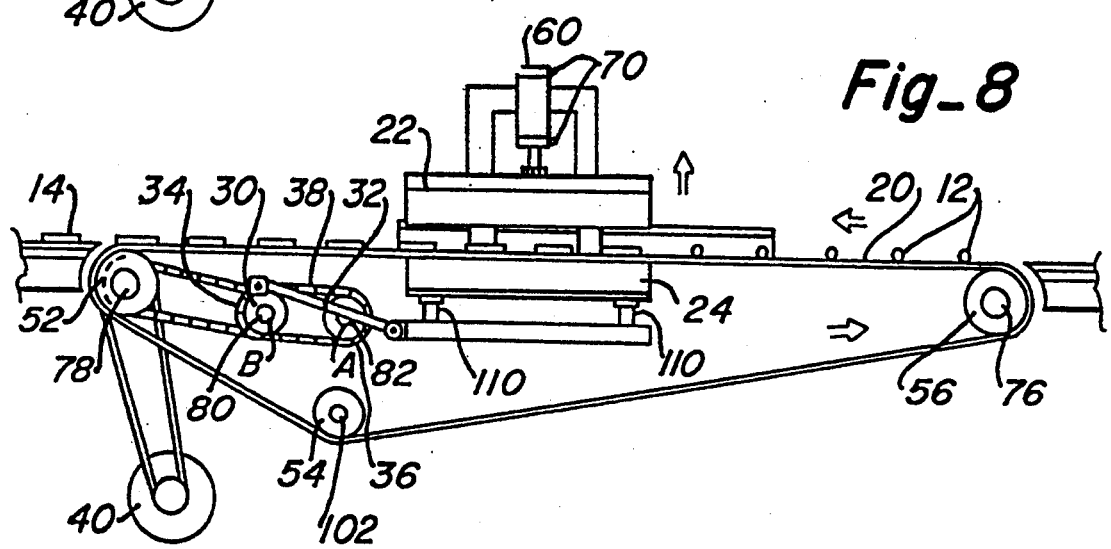
Fig_8

HIGH SPEED FOOD PROCESSING DEVICE

This is a continuation of application Ser. No. 07/739,813, filed on Aug. 2, 1991, now abandoned which is a continuation-in-part of Ser. No. 07/459,150,

BACKGROUND OF THE INVENTION

The present invention relates to a high speed food processing device. In the food industry, in particular the fast food industry, certain food products are high volume consumption items, but have been relatively slow in their production. For example, tortillas are a high consumption product, but the methods for producing them have been relatively slow.

In U.S. Pat. No. 4,197,792, Mendoza discloses a continuously moving upper and lower band which also moves vertically up and down in a repetitive manner in order to compress and cook the dough as it travels along the continuous heated bands. A specific disadvantage of this device is that there is a required lag time or dead space equivalent to the length of the cooking area. The present invention eliminates this problem and has a small distance at the front and rear of the platens, approximately ¾ of an inch which does not receive food stuff and is not in contact with the heated platens.

U.S. Pat. No. 3,397,655, Valadez discloses a tortilla manufacturing machine which includes an upper and lower heated platen. Valadez is limited to the cooking of one tortilla at a time.

U.S. Pat. No. 4,938,126, Rubio discloses a apparatus which requires a timing system and has two separate drive mechanisms for the purpose of; (1) moving the continuous non-stick belt and (2) the forward and rearward movement of the platens. Rubio specifically indicates that the press conveyer belt moves at a selected steady rate of speed and the press, which moves back and forth, the movements are coordinated by timing mechanism whereby in present invention the press cycle and the movement of the non-stick cooking service are an integral single system so that if the drive motor slows down the movement of the conveyer belt, the movement of the platens being interconnected slows accordingly. Such is because of the direct drive and does not rely on any timing mechanism and is strictly a mechanical interface.

SUMMARY OF THE INVENTION

The present invention allows a plurality of moldable dough balls to be cooked simultaneously while the continuous moving non-stick belt is loaded behind the heated platens with the next group of dough balls to be cooked. The heated platens move horizontally in synchronization with the continuous moving non-stick belt, by a single interconnected drive mechanism, simultaneously forming and cooking the food product. When the platens have moved approximately ½ the length of the platens, pressure is released from the platens and the upper heated platen moves vertically sufficiently to extend over the dough balls as the platens return to their rearmost position. As the platens reach their rearmost position and start moving forward again, the continuous moving belt has moved the food stuff to a position under the heated platens and the upper platen moves vertically down and the pressure is applied to the food stuff on the continuous moving non-stick belt and the platens move forward with the belt in another cycle.

BRIEF DESCRIPTION OF THE DRAWINGS

FIG. 1 is a perspective of the continuous moving food processing device.

FIG. 2 is a front view taken along 2—2 of the continuous moving food device.

FIG. 3 is a cross-sectional view taken along lines 3—3 of the continuous moving food processing device.

FIG. 4 is an oblique perspective of the drive mechanism taken along the lines 4—4.

FIG. 5 is a cross-sectional view of the platen guides taken along the lines 5—5 of the continuous moving food processing device.

FIG. 6 is a side perspective view taken along the lines 3—3 with the upper platen starting its downward vertical movement of the continuous moving food processing device.

FIG. 7 is a side perspective view taken along the lines 3—3 with the platen in the clamped position and moving synchronously with the continuously moving non-stick belt of the continuous moving food processing device.

FIG. 8 is a side perspective view taken along the lines 3—3 with the upper platen traveling vertically upward at the end of the cook cycle of the continuous moving food processing device.

DETAILED DESCRIPTION OF THE DRAWINGS

The food processing device 10 as shown in FIG. 1 receives the moldable dough 12 at the rearward portion of the food processing device 10 and the pre-cooked and formed food product 14 is removed from the forward portion of the food processing device 10. Cover 16 is shown in place on the food processing device 10 of FIG. 1.

The food processing device 10 receives moldable dough 12 at the rearward portion of the continuous non-stick belt 20 and moves forward until a specific batch is between the upper heated platen 22 and lower heated platen 24 at its rearward most position. The upper heated platen 22 and lower heated platen 24 simultaneously move forward in the open position until the forward portion of arm 32, which is attached to a caterpillar chain 38 and thus always moving at the rate as chain 38, reaches point A on the caterpillar drive assembly 30 as shown in FIG. 6. The rear portion of arm 32 is affixed to the lower heated platen 24, which when moving, inherently moves at the same rate as chain 38 due to the direct connection by arm 32. In other words, the platens move at the same rate as chain 38 in both their backward and forward travels. The hydraulic cylinder/piston 60 is then actuated and instantly moves the upper heated platen 22 downward contacting and forming the moldable dough 12 into the flattened product on the continuous non-stick belt 20 as the upper heated platen 22, the continuous non-stick belt 20, and the lower heated platen 24 simultaneously move forward as shown in FIG. 7. In the time taken for the forward portion of arm 32 to travel forward from point A to B on the caterpillar drive assembly 30 with the upper heated platen 22, the continuous non-stick belt 20 and the lower heated platen 24 held in contact by pressure from hydraulic cylinder/piston 60, the moldable dough 12 is simultaneously formed into the flat, and cooked food product 14 such as a tortilla. When the forward portion of arm 32 reaches point B on the caterpillar drive assembly 30, hydraulic cylinder/- piston 60 is activated instantly causing the upper heated platen 22 to raise as shown in FIG. 8. The distance between point A and point B on the caterpillar drive 30 is the maximum time which can be used to cook the food product.

One revolution of caterpillar drive assembly 30 is the same distance as the incremental movement of the continuous non-stick belt 20. It is necessary that the caterpillar drive 30 and the continuous non-stick belt 20 are synchronous in their movement. The continuous non-stick belt 20 continues to move forward as the upper heated platen 22 and the lower heated platen 24 in the open position travel in the opposite direction of the motion of the continuous non-stick belt 20 to start the cycle again as shown in FIG. 9. In operation the upper heated platen 22 and lower heated platen 24 reset over the moldable dough 12 leaving approximately ¾ inch at the front and rear of the upper and lower heated platens 22 and 24 respectively which do not ever receive the moldable dough 12 or come in pressure contact with the upper heated platen 22. As an example for illustrative purposes only, if the caterpillar chain 38 has a length of 37½ inches, the continuous non-stick belt 20 will travel 37½ inches with one complete revolution of the caterpillar drive 30. With a 36 inch long upper heated platen 22, this allows a small amount of travel of the continuous non-stick belt 20 in which there is no food product on the continuous non-stick belt 20 or contact with the upper heated platen 22.

As shown in FIG. 4 the caterpillar or planter drive assembly 30 consists of two rear shafts 82, 82' and two forward shafts 80, 80' with two rear gears 36, 36' and two forward gears 34, 34' respectively. Caterpillar chains 38, 38' connect the forward gears 34, 34' and rear gears 36, 36' respectively and are interconnected by shaft 84 which is affixed to caterpillar chains 38, 38''. The forward portion of arms 32, 32' are affixed to shaft 84 adjacent the points shaft 84 is affixed to caterpillar chain 38 and 38' respectively as shown in FIG. 4. Arms 32, 32' are affixed to the lower heated platen 24 at the rear portion of arms 32, 32' and near the outer portion of the lower heated platen 34 which generates the forward and rearward movement of the upper and lower heated platen 22 and 24 respectively upon the rotation of the caterpillar drive 30.

Caterpillar drive 30 is driven by the rotation of gear 92 which is affixed to shaft 80 and driven by chain 74 through gear 90. Gear 90 is affixed to shaft 58. Drive motor 40 powers gear 46 which drives gear 86 through drive chain 48 in turn driving shaft 58 as shown in FIG. 3 and FIG. 7. A belt drive assembly includes a forward roller 52 affixed to shaft 78 which extends the width and is affixed at its outer ends to frame 18. Axle 78 which is affixed to gears 94, 94' and gears 88, 88'. Gears 88, 88' provide forward motion to the continuous non-stick belt 20. Gear 94 obtains its rotary motion through its connection to gear 92 by chain 98. Gear 94' drives gear 96' through the interconnection with chain 98' as shown in FIG. 4. Since gears 92, 96 and 34 are all shown mounted on a common shaft 80, they will all rotate at the same speed when driven by chain 74.

Upper heated platen 22 and lower heated platen 24 are interconnected by bracket 104. Horizontal guides 26, 26' attached to frame 18 guide the upper heated platen 22 and lower heated platen 24 in its forward and rearward movement. Vertical guides 28, 28' provide vertical directional control for the upper heated platen 22 for the upward and downward movement as shown in FIG. 5.

The moldable dough 12 is transported on the continuous non-stick belt 20 (not shown) which is driven by gears 88, 88' as shown in FIG. 4. As shown in FIG. 3, the continuous non-stick belt 20 is held in place and travels over rollers 52, 54, and 56 which are affixed to frame 18 through shafts 78, 102, and 76 which extend the width of frame 18 and are attached thereto by ordinary means.

The thickness of the cooked product 14 may be controlled by the adjustment of the down travel of the upper heated platen 22, the pressure imposed on the upper heated platen 22 through hydraulic cylinder/piston 60, or the height adjustment 110 of the lower heated platen 24 as shown in FIG. 3.

The hydraulic system 108 is a standard hydraulic system having pump 62, hoses 70, accumulator 66, reservoir 68 and cylinder/piston 60 and is activated by the timing device 106.

In operation, the moldable dough 12 is placed on the continuous non-stick belt 20 which travels forward until it is under the upper heated platen 22 which is at its rearward most position. When the forward portion of arms 32, 32' reaches point A on the caterpillar drive 30, the timing device 106 actuates the hydraulic system 108 causing cylinder/piston 60 to immediately lower the upper heated platen 22 forming and cooking moldable dough 12 on the continuous non-stick belt 20 between the upper heated platen 22 and the lower heated platen 24. The upper heated platen 22 and the lower heated platen 24 moves synchronously with the continuous non-stick belt 20 until the arms 32, 32' reach point B on the caterpillar drive 30 at which time device 106 activates the hydraulic system 108 causing cylinder/piston 60 to raise the upper heated platen 22 allowing the cooked product 14 to travel forward and be removed for further processing and packaging. The food processing device 10 continues this cycle processing large quantities of the tortillas or like food product.

The continuous non-stick belt 20 may be a single belt or made up of segments (21) being approximately 1½ inches longer in length than the length of the upper heated platen 22 in order that the dough does not get placed on the connecting portions of the belt as shown in FIG. 8. This would allow the replacement of a single segment and not the entire belt.

The continuous non-stick belt 20 may be purchased with the commercially available "Teflon" coating. The non-stick belt 20 may also be made of multiple segments. Although there are two chain drives, one on each side of the press a single chain drive could be substituted and accomplish the same task. The dual system is preferred to eliminate possible binding of the system.

The electrical system is a standard system available and capable of operating utilizing standard 220 power. The electrical system 150 provides the necessary electrical power to actuate the hydraulic system 60, heat the platens and power the drive motor 40.

The upper and lower heated platens may be heated by electrical or gas fired means.

While the foregoing specification embodiment of the invention has been set forth in considerable detail for the purposes of making a complete disclosure of the invention, it will be apparent to those skilled in the art that numerous changes may be made in such detail without departing from the spirit and principle of the invention.

What is claimed:

1. A high speed food processing device comprising:
a frame;
said frame having a drive means affixed thereto;
said drive means including a belt drive assembly including a chain and gears for providing continuous forward movement to a continuous belt means; and
a platen drive assembly including a chain and gears for providing cyclic movement to a platen means;
said belt drive assembly is interconnected with said platen drive assembly by a common shaft which is driven by a gear in order to move both drive assemblies continuously at the same rate of travel;
said belt means capable of conveying a food product from a rearward position to a forward position;
said platen means having an upper platen means and a lower platen means capable of communicating with said continuous belt means;
a means affixed to said upper platen means for providing an opening and closing pressure between said upper platen means and said lower platen means; and
an electrical means capable of providing the necessary electrical power to said drive means and to actuate said means for opening and closing said platen means.

2. The device of claim 1 wherein said belt means is non-stick.

3. The device of claim 1 further including a platen guide means communicating with said upper plate means and said lower plate means to simultaneously provide vertical and horizontal guidance of said platen means.

4. The device of claim 1 wherein said means for providing opening and closing pressure to said platen means is hydraulic.

5. A drive device for moving an interconnected upper and lower heated platen of a high speed food processing device comprising:
a frame;
a drive means affixed to said frame;
said drive means including gears and a chain linearly integral and affixed to the lower portion of said lower platen by a link arm capable of moving the interconnected upper and lower heated platens forward and backward along a guide means at a constant rate of travel in both the forward and rearward direction;
said guide means mounted on said frame in a manner that said upper and lower heated platens move synchronously horizontally and said upper heated platen simultaneously moves vertically;
whereby a single rotation of said chain is equivalent to the processing of a single batch of food stuff in said high speed food processing device.

6. A high speed food processing device comprising:
a frame;
said frame having a drive means affixed thereto;
said drive means for simultaneously providing continuous forward movement to a continuous belt means and cyclic movement to a platen means;
a connection arm for linking said drive means to said platen means wherein said connection arm continuously moves at the same rate of travel as said belt means;
said belt means capable of conveying a food product from a rearward position to a forward position;
said platen means having an upper platen means and a lower platen means capable of communicating with said continuous belt means;
a means affixed to said upper platen means for providing an opening and closing pressure between said upper platen means and said lower platen means; and
an electrical means capable of providing the necessary electrical power to said drive means and to actuate said means for opening and closing said platen means.

* * * * *